(12) United States Patent
Dhanjal et al.

(10) Patent No.: US 7,886,290 B2
(45) Date of Patent: Feb. 8, 2011

(54) CROSS VERSION AND CROSS PRODUCT USER INTERFACE

(75) Inventors: Savraj Singh Dhanjal, Bellevue, WA (US); Sylvia Antje Hayashi, Bellevue, WA (US); David Andrew Morton, Redmond, WA (US); Preethi Ramani, Seattle, WA (US); Angela Wai Ga So, Bothell, WA (US); Andy Chung-An Chang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 11/154,278

(22) Filed: Jun. 16, 2005

(65) Prior Publication Data

US 2007/0006206 A1    Jan. 4, 2007

(51) Int. Cl.
  *G06F 3/048* (2006.01)
  *G06F 3/00* (2006.01)
  *G06F 9/44* (2006.01)
(52) U.S. Cl. .................. 717/170; 715/866; 715/826
(58) Field of Classification Search ................ 717/170; 715/762, 763, 825, 826, 841, 844
  See application file for complete search history.

(56) References Cited

U.S. PATENT DOCUMENTS

| | | | |
|---|---|---|---|
| 4,823,283 A | 4/1989 | Diehm et al. | 715/825 |
| 5,155,806 A | 10/1992 | Hoeber et al. | 715/711 |
| 5,247,438 A | 9/1993 | Subas et al. | 700/90 |
| 5,323,314 A | 6/1994 | Baber et al. | 705/8 |
| 5,377,354 A | 12/1994 | Scannell et al. | 718/103 |
| 5,500,936 A | 3/1996 | Allen et al. | 395/156 |
| 5,519,606 A | 5/1996 | Frid-Nielsen et al. | 705/9 |
| 5,559,875 A | 9/1996 | Bieselin et al. | 379/202.01 |
| 5,559,944 A | 9/1996 | Ono | 715/841 |

(Continued)

FOREIGN PATENT DOCUMENTS

EP    0 910 007    4/1999

(Continued)

OTHER PUBLICATIONS

Philippines Examiner's Action dated Aug. 19, 2008 cited in Application No. 1-2005-000405.

(Continued)

*Primary Examiner*—Emerson C Puente
*Assistant Examiner*—Paul Mills
(74) *Attorney, Agent, or Firm*—Merchant & Gould (57) ABSTRACT

When a user interface of a parent software application is modified such that user interface components of an add-in application are not compatible with the parent application user interface, user interface components associated with functionalities of the add-in application are added to the modified parent application user interface. A prior user interface of the parent application to which the add-in application user interface components are added is run in a background of the parent application and is not visible to users. User interface components in the parent application user interface are linked to corresponding add-in application user interface components in the prior user interface. Selection of a user interface component from the present user interface that is associated with an add-in application functionality causes selection of a corresponding user interface component in the background user interface, and the associated add-in functionality is executed.

20 Claims, 4 Drawing Sheets

U.S. PATENT DOCUMENTS

| | | | |
|---|---|---|---|
| 5,570,109 A | 10/1996 | Jenson | 715/823 |
| 5,588,107 A | 12/1996 | Bowden et al. | 715/828 |
| 5,596,694 A | 1/1997 | Capps | 345/473 |
| 5,634,100 A | 5/1997 | Capps | 705/9 |
| 5,634,128 A | 5/1997 | Messina | 710/200 |
| 5,638,504 A | 6/1997 | Scott et al. | 715/202 |
| 5,644,737 A | 7/1997 | Tuniman et al. | 715/810 |
| 5,659,693 A | 8/1997 | Hansen et al. | 715/779 |
| 5,664,127 A | 9/1997 | Anderson et al. | 715/776 |
| 5,664,208 A | 9/1997 | Pavley et al. | 715/209 |
| 5,673,403 A * | 9/1997 | Brown et al. | 715/744 |
| 5,721,847 A | 2/1998 | Johnson | 395/333 |
| 5,760,773 A | 6/1998 | Berman et al. | 715/808 |
| 5,761,646 A | 6/1998 | Frid-Nielsen et al. | 705/9 |
| 5,778,402 A | 7/1998 | Gipson | 707/530 |
| 5,778,404 A | 7/1998 | Capps et al. | 715/531 |
| 5,805,167 A | 9/1998 | Van Cruyningen | 715/808 |
| 5,812,132 A | 9/1998 | Goldstein | 715/797 |
| 5,821,936 A | 10/1998 | Shaffer et al. | 715/810 |
| 5,828,376 A | 10/1998 | Solimene et al. | 715/821 |
| 5,842,009 A | 11/1998 | Borovoy et al. | 707/1 |
| 5,844,558 A | 12/1998 | Kumar et al. | 345/339 |
| 5,844,572 A | 12/1998 | Schott | 345/440 |
| 5,855,006 A | 12/1998 | Huemoeller et al. | 705/9 |
| 5,873,108 A | 2/1999 | Goyal et al. | 715/203 |
| 5,885,006 A | 3/1999 | Sheedy | 384/192 |
| 5,893,073 A | 4/1999 | Kasso et al. | 705/8 |
| 5,893,125 A | 4/1999 | Shostak | 715/206 |
| 5,898,436 A | 4/1999 | Stewart et al. | 345/354 |
| 5,899,979 A | 5/1999 | Miller et al. | 705/9 |
| 5,905,863 A | 5/1999 | Knowles et al. | 709/206 |
| 5,926,806 A | 7/1999 | Marshall et al. | 707/3 |
| 5,936,625 A | 8/1999 | Kahl et al. | 715/775 |
| 5,937,160 A | 8/1999 | Davis et al. | 709/203 |
| 5,940,847 A | 8/1999 | Fein et al. | 707/540 |
| 5,943,051 A | 8/1999 | Onda et al. | 715/786 |
| 5,960,406 A | 9/1999 | Rasansky et al. | 705/9 |
| 5,970,466 A | 10/1999 | Detjen et al. | 705/8 |
| 5,999,938 A | 12/1999 | Bliss et al. | 707/102 |
| 6,008,806 A | 12/1999 | Nakajima et al. | 345/335 |
| 6,012,075 A | 1/2000 | Fein et al. | 707/540 |
| 6,016,478 A | 1/2000 | Zhang et al. | 705/9 |
| 6,018,343 A | 1/2000 | Wang et al. | 345/356 |
| 6,034,683 A | 3/2000 | Mansour et al. | 715/764 |
| 6,038,542 A | 3/2000 | Ruckdashel | 705/9 |
| 6,067,087 A * | 5/2000 | Krauss et al. | 715/762 |
| 6,072,492 A * | 6/2000 | Schagen et al. | 715/733 |
| 6,085,206 A | 7/2000 | Domini et al. | 707/533 |
| 6,101,480 A | 8/2000 | Conmy et al. | 705/9 |
| 6,133,915 A | 10/2000 | Arcuri et al. | 715/779 |
| 6,175,363 B1 | 1/2001 | Williams et al. | 345/334 |
| 6,188,403 B1 | 2/2001 | Sacerdoti et al. | 715/764 |
| 6,192,381 B1 | 2/2001 | Stiegemeier et al. | 707/505 |
| 6,211,879 B1 | 4/2001 | Soohoo | 345/357 |
| 6,216,122 B1 | 4/2001 | Elson | 707/3 |
| 6,219,670 B1 | 4/2001 | Mocek et al. | 707/102 |
| 6,222,540 B1 | 4/2001 | Sacerdoti | 345/440 |
| 6,230,309 B1 | 5/2001 | Turner et al. | 717/1 |
| 6,232,971 B1 | 5/2001 | Haynes | 345/340 |
| 6,236,396 B1 | 5/2001 | Jenson et al. | 715/764 |
| 6,256,628 B1 | 7/2001 | Dobson et al. | 707/6 |
| 6,269,341 B1 | 7/2001 | Redcay, Jr. | 705/8 |
| 6,289,317 B1 | 9/2001 | Peterson | 705/7 |
| 6,307,544 B1 | 10/2001 | Harding | 715/709 |
| 6,323,883 B1 | 11/2001 | Minoura et al. | 715/784 |
| 6,326,962 B1 | 12/2001 | Szabo | 715/762 |
| 6,327,046 B1 | 12/2001 | Miyamoto et al. | 358/1.15 |
| 6,353,451 B1 | 3/2002 | Teibel et al. | 345/803 |
| 6,359,634 B1 | 3/2002 | Cragun et al. | 715/777 |
| 6,373,507 B1 | 4/2002 | Camara et al. | 345/825 |
| 6,384,849 B1 | 5/2002 | Morcos et al. | 715/810 |
| 6,405,216 B1 | 6/2002 | Minnaert et al. | 707/104.1 |
| 6,424,829 B1 | 7/2002 | Kraft | 455/412.1 |
| 6,442,527 B1 | 8/2002 | Worthington | 705/8 |
| 6,456,304 B1 | 9/2002 | Angiulo et al. | 345/779 |
| 6,457,062 B1 | 9/2002 | Pivowar et al. | 709/248 |
| 6,466,236 B1 | 10/2002 | Pivowar et al. | 715/835 |
| 6,469,722 B1 | 10/2002 | Kineo et al. | 345/837 |
| 6,480,865 B1 | 11/2002 | Lee et al. | 715/523 |
| 6,493,006 B1 | 12/2002 | Gourdol et al. | 715/825 |
| 6,493,731 B1 | 12/2002 | Jones et al. | 707/501.1 |
| 6,546,417 B1 | 4/2003 | Baker | 709/206 |
| 6,564,377 B1 | 5/2003 | Jayasimha et al. | 717/174 |
| 6,570,596 B2 | 5/2003 | Frederiksen | 715/808 |
| 6,578,192 B1 | 6/2003 | Boehme et al. | 717/115 |
| 6,583,798 B1 | 6/2003 | Hoek et al. | 345/822 |
| 6,621,504 B1 | 9/2003 | Nadas et al. | 715/723 |
| 6,621,508 B1 | 9/2003 | Shiraishi et al. | 715/810 |
| 6,635,089 B1 | 10/2003 | Burkett et al. | 715/513 |
| 6,664,983 B2 | 12/2003 | Ludolph | 715/775 |
| 6,680,749 B1 | 1/2004 | Anderson et al. | 348/231.99 |
| 6,691,281 B1 | 2/2004 | Sorge et al. | 715/503 |
| 6,708,205 B2 | 3/2004 | Sheldon et al. | 709/206 |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,890 B1 | 6/2004 | Sugimoto | 715/838 |
| 6,778,990 B2 | 8/2004 | Garcia et al. | 707/10 |
| 6,785,868 B1 | 8/2004 | Raff | 715/530 |
| 6,825,859 B1 | 11/2004 | Severenuk et al. | 345/764 |
| 6,850,255 B2 | 2/2005 | Muschetto | 715/788 |
| 6,857,103 B1 | 2/2005 | Wason | 715/709 |
| 6,871,195 B2 | 3/2005 | Ryan et al. | 706/46 |
| 6,882,354 B1 | 4/2005 | Nielsen | 715/784 |
| 6,904,449 B1 | 6/2005 | Quinones | 709/203 |
| 6,906,717 B2 | 6/2005 | Couckuyt et al. | 345/440 |
| 6,915,492 B2 | 7/2005 | Kurtenbach et al. | 715/810 |
| 6,925,605 B2 | 8/2005 | Bates et al. | 709/206 |
| 6,931,623 B2 | 8/2005 | Vermeire et al. | 717/108 |
| 6,964,025 B2 | 11/2005 | Angiulo et al. | 715/838 |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 7,027,463 B2 | 4/2006 | Mathew et al. | |
| 7,039,596 B1 | 5/2006 | Lu | 705/8 |
| 7,046,848 B1 | 5/2006 | Olcott | 382/176 |
| 7,086,006 B2 | 8/2006 | Subramanian | |
| 7,093,162 B2 | 8/2006 | Barga et al. | 714/15 |
| 7,107,544 B1 | 9/2006 | Luke | 715/752 |
| 7,110,936 B2 | 9/2006 | Hiew et al. | 703/22 |
| 7,111,238 B1 | 9/2006 | Kuppusamy et al. | |
| 7,117,370 B2 | 10/2006 | Khan et al. | 713/186 |
| 7,152,207 B1 | 12/2006 | Underwood et al. | 715/526 |
| 7,181,697 B2 | 2/2007 | Tai et al. | 715/779 |
| 7,188,073 B1 | 3/2007 | Tam et al. | 705/9 |
| 7,188,158 B1 | 3/2007 | Stanton et al. | 709/220 |
| 7,212,208 B2 | 5/2007 | Khozai | 345/440 |
| 7,216,301 B2 | 5/2007 | Moehrle | 715/811 |
| 7,218,976 B2 | 5/2007 | Minagawa | |
| 7,219,305 B2 | 5/2007 | Jennings | |
| 7,225,244 B2 | 5/2007 | Reynolds et al. | |
| 7,234,132 B2 | 6/2007 | Lam | 717/120 |
| 7,240,323 B1 | 7/2007 | Desai et al. | 717/100 |
| 7,249,325 B1 | 7/2007 | Donaldson | 715/777 |
| 7,263,668 B1 | 8/2007 | Lentz | 715/801 |
| 7,290,033 B1 | 10/2007 | Goldman et al. | 709/206 |
| 7,325,204 B2 | 1/2008 | Rogers | 715/792 |
| 7,328,409 B2 | 2/2008 | Awada et al. | 715/765 |
| 7,337,185 B2 | 2/2008 | Ellis et al. | 707/102 |
| 7,346,705 B2 | 3/2008 | Hullot et al. | 709/238 |
| 7,346,769 B2 | 3/2008 | Forlenza et al. | 713/151 |
| 7,386,535 B1 | 6/2008 | Kalucha et al. | |
| 7,386,835 B1 | 6/2008 | Desai | |
| 7,392,249 B1 | 6/2008 | Harris et al. | 707/5 |

| Patent/Pub No. | Date | Inventor(s) | Class |
|---|---|---|---|
| 7,395,221 B2 | 7/2008 | Doss et al. | 705/9 |
| 7,395,500 B2 | 7/2008 | Whittle et al. | |
| 7,421,660 B2 | 9/2008 | Charnock et al. | 715/751 |
| 7,421,690 B2 | 9/2008 | Forstall et al. | 709/206 |
| 7,469,385 B2 | 12/2008 | Harper et al. | |
| 7,472,117 B2 | 12/2008 | Dettinger et al. | 1/1 |
| 7,505,954 B2 | 3/2009 | Heidloff et al. | 707/1 |
| 7,530,029 B2 | 5/2009 | Satterfield et al. | 715/779 |
| 7,555,707 B1 | 6/2009 | Labarge et al. | 715/234 |
| 7,567,964 B2 | 7/2009 | Brice et al. | 707/9 |
| 7,627,561 B2 | 12/2009 | Pell et al. | 707/3 |
| 7,703,036 B2 | 4/2010 | Satterfield et al. | 715/777 |
| 7,707,255 B2 | 4/2010 | Satterfield et al. | 709/206 |
| 7,711,742 B2 | 5/2010 | Bennett et al. | 707/759 |
| 7,716,593 B2 | 5/2010 | Durazo et al. | 715/752 |
| 7,739,259 B2 | 6/2010 | Hartwell et al. | 707/706 |
| 7,747,966 B2 | 6/2010 | Leukart et al. | 715/792 |
| 7,788,598 B2 | 8/2010 | Bansal et al. | 715/810 |
| 2001/0035882 A1 | 11/2001 | Stoakley et al. | 715/779 |
| 2002/0007380 A1 | 1/2002 | Bauchot et al. | 707/530 |
| 2002/0029247 A1 | 3/2002 | Kawamoto | 709/206 |
| 2002/0037754 A1 | 3/2002 | Hama et al. | 455/566 |
| 2002/0052721 A1 | 5/2002 | Ruff et al. | 703/1 |
| 2002/0070977 A1 | 6/2002 | Morcos et al. | 345/810 |
| 2002/0075330 A1 | 6/2002 | Rosenzweig et al. | 345/854 |
| 2002/0078143 A1 | 6/2002 | DeBoor et al. | |
| 2002/0083054 A1 | 6/2002 | Peltonen et al. | 707/5 |
| 2002/0083097 A1 | 6/2002 | Warrington | 715/229 |
| 2002/0091697 A1 | 7/2002 | Huang et al. | 707/10 |
| 2002/0122071 A1 | 9/2002 | Camara et al. | |
| 2002/0133557 A1 | 9/2002 | Winarski | 709/207 |
| 2002/0135621 A1 | 9/2002 | Angiulo et al. | 345/838 |
| 2002/0140740 A1 | 10/2002 | Chen | |
| 2002/0149623 A1 | 10/2002 | West et al. | 345/765 |
| 2002/0149629 A1 | 10/2002 | Craycroft et al. | 345/861 |
| 2002/0154178 A1 | 10/2002 | Barnett et al. | 715/853 |
| 2002/0158876 A1 | 10/2002 | Janssen | 345/504 |
| 2002/0163538 A1 | 11/2002 | Shteyn | 345/752 |
| 2002/0175955 A1 | 11/2002 | Gourdol et al. | 345/821 |
| 2003/0009455 A1 | 1/2003 | Carlson et al. | 707/6 |
| 2003/0011638 A1 | 1/2003 | Chung | 345/808 |
| 2003/0011639 A1 | 1/2003 | Webb | 345/808 |
| 2003/0014490 A1 | 1/2003 | Bates et al. | 709/206 |
| 2003/0022700 A1 | 1/2003 | Wang | 455/566 |
| 2003/0025732 A1 | 2/2003 | Prichard | |
| 2003/0035917 A1 | 2/2003 | Hyman | 428/67 |
| 2003/0038832 A1 | 2/2003 | Sobol | |
| 2003/0043200 A1 | 3/2003 | Faieta et al. | 345/804 |
| 2003/0043211 A1 | 3/2003 | Kremer et al. | |
| 2003/0046528 A1 | 3/2003 | Haitani et al. | 713/2 |
| 2003/0066025 A1 | 4/2003 | Garner et al. | 715/500 |
| 2003/0093490 A1 | 5/2003 | Yamamoto et al. | 709/213 |
| 2003/0097361 A1 | 5/2003 | Huang et al. | 707/10 |
| 2003/0098891 A1 | 5/2003 | Molander | 715/841 |
| 2003/0110191 A1 | 6/2003 | Handsaker et al. | 707/503 |
| 2003/0112278 A1 | 6/2003 | Driskell | 715/788 |
| 2003/0135825 A1 | 7/2003 | Gertner et al. | |
| 2003/0156140 A1 | 8/2003 | Watanabe | 345/810 |
| 2003/0160821 A1 | 8/2003 | Yoon | |
| 2003/0167310 A1 | 9/2003 | Moody et al. | 709/206 |
| 2003/0169284 A1 | 9/2003 | Dettinger et al. | 707/3 |
| 2003/0195937 A1 | 10/2003 | Kircher et al. | 709/207 |
| 2003/0206646 A1 | 11/2003 | Brackett | |
| 2003/0218611 A1 | 11/2003 | Ben-Tovim et al. | 345/440 |
| 2003/0226106 A1 | 12/2003 | McKellar et al. | 715/513 |
| 2003/0227487 A1 | 12/2003 | Hugh | 715/777 |
| 2003/0233419 A1 | 12/2003 | Beringer | 709/206 |
| 2004/0003351 A1 | 1/2004 | Sommerer et al. | 715/251 |
| 2004/0012633 A1 | 1/2004 | Helt | |
| 2004/0056894 A1 | 3/2004 | Zaika et al. | 345/762 |
| 2004/0090315 A1 | 5/2004 | Mackjust et al. | 340/426.13 |
| 2004/0100504 A1 | 5/2004 | Sommer | 345/810 |
| 2004/0100505 A1 | 5/2004 | Cazier | 345/811 |
| 2004/0107197 A1 | 6/2004 | Shen et al. | 707/9 |
| 2004/0109025 A1 | 6/2004 | Hullot et al. | 715/764 |
| 2004/0109033 A1 | 6/2004 | Vienneau et al. | 345/863 |
| 2004/0117451 A1 | 6/2004 | Chung | 709/207 |
| 2004/0119760 A1 | 6/2004 | Grossman et al. | 715/854 |
| 2004/0122789 A1 | 6/2004 | Ostertag et al. | |
| 2004/0125142 A1 | 7/2004 | Mock et al. | 345/765 |
| 2004/0128275 A1 | 7/2004 | Moehrle | 707/1 |
| 2004/0133854 A1 | 7/2004 | Black | 715/517 |
| 2004/0142720 A1 | 7/2004 | Smethers | 455/550.1 |
| 2004/0153968 A1 | 8/2004 | Ching et al. | 715/513 |
| 2004/0164983 A1 | 8/2004 | Khozai | 345/440 |
| 2004/0168153 A1* | 8/2004 | Marvin | 717/120 |
| 2004/0186775 A1 | 9/2004 | Margiloff et al. | 705/14 |
| 2004/0189694 A1 | 9/2004 | Kurtz et al. | |
| 2004/0192440 A1 | 9/2004 | Evans | |
| 2004/0221234 A1 | 11/2004 | Imai | 715/256 |
| 2004/0230508 A1 | 11/2004 | Minnis et al. | 705/35 |
| 2004/0230906 A1 | 11/2004 | Pik et al. | 715/522 |
| 2004/0239700 A1 | 12/2004 | Baschy | 715/781 |
| 2004/0243938 A1 | 12/2004 | Weise et al. | 715/205 |
| 2004/0261013 A1 | 12/2004 | Wynn et al. | 715/511 |
| 2004/0268270 A1 | 12/2004 | Hill et al. | 715/963 |
| 2005/0004989 A1 | 1/2005 | Satterfield et al. | 709/206 |
| 2005/0004990 A1 | 1/2005 | Durazo et al. | 709/206 |
| 2005/0005235 A1 | 1/2005 | Satterfield et al. | 715/519 |
| 2005/0005249 A1 | 1/2005 | Hill et al. | 715/963 |
| 2005/0021504 A1 | 1/2005 | Atchison | 707/3 |
| 2005/0022116 A1 | 1/2005 | Bowman et al. | 715/513 |
| 2005/0039142 A1 | 2/2005 | Jalon et al. | 715/823 |
| 2005/0043015 A1 | 2/2005 | Muramatsu | 455/412.1 |
| 2005/0044500 A1 | 2/2005 | Orimoto et al. | 715/706 |
| 2005/0057584 A1 | 3/2005 | Gruen et al. | 345/752 |
| 2005/0086135 A1 | 4/2005 | Lu | 705/30 |
| 2005/0091576 A1 | 4/2005 | Relyea et al. | |
| 2005/0097465 A1 | 5/2005 | Giesen et al. | 715/700 |
| 2005/0114776 A1 | 5/2005 | Branson et al. | 715/711 |
| 2005/0117179 A1 | 6/2005 | Ito et al. | 358/1.15 |
| 2005/0138576 A1 | 6/2005 | Baumert et al. | 715/862 |
| 2005/0144241 A1 | 6/2005 | Stata et al. | |
| 2005/0172262 A1 | 8/2005 | Lalwani | 717/109 |
| 2005/0203975 A1* | 9/2005 | Jindal et al. | 707/204 |
| 2005/0216863 A1 | 9/2005 | Schumacher et al. | 715/827 |
| 2005/0223329 A1 | 10/2005 | Schwartz et al. | 715/711 |
| 2005/0256867 A1 | 11/2005 | Walther et al. | 707/5 |
| 2005/0278656 A1 | 12/2005 | Goldthwaite et al. | 715/810 |
| 2005/0289156 A1 | 12/2005 | Maryka et al. | 707/100 |
| 2005/0289159 A1 | 12/2005 | Weiss et al. | 707/100 |
| 2006/0015816 A1 | 1/2006 | Kuehner | |
| 2006/0020962 A1 | 1/2006 | Stark | 725/32 |
| 2006/0036580 A1 | 2/2006 | Stata et al. | 707/3 |
| 2006/0036945 A1 | 2/2006 | Radtke et al. | 715/708 |
| 2006/0036946 A1 | 2/2006 | Radtke et al. | 715/711 |
| 2006/0036950 A1 | 2/2006 | Himberger et al. | 715/732 |
| 2006/0036964 A1 | 2/2006 | Satterfield et al. | 715/777 |
| 2006/0036965 A1 | 2/2006 | Harris et al. | 715/777 |
| 2006/0041545 A1 | 2/2006 | Heidloff et al. | 707/4 |
| 2006/0047644 A1 | 3/2006 | Bocking et al. | |
| 2006/0059035 A1 | 3/2006 | Kraft | |
| 2006/0069604 A1 | 3/2006 | Leukart et al. | 705/9 |
| 2006/0069686 A1 | 3/2006 | Beyda et al. | 707/10 |
| 2006/0080303 A1 | 4/2006 | Sargent et al. | 707/3 |
| 2006/0095865 A1 | 5/2006 | Rostom | 715/810 |
| 2006/0101051 A1 | 5/2006 | Carr et al. | 707/102 |
| 2006/0101350 A1 | 5/2006 | Scott | 715/779 |
| 2006/0111931 A1 | 5/2006 | Johnson et al. | 705/1 |
| 2006/0117249 A1 | 6/2006 | Hu et al. | 715/255 |
| 2006/0129937 A1 | 6/2006 | Shafron | 715/733 |
| 2006/0155689 A1 | 7/2006 | Blakeley et al. | 707/3 |
| 2006/0173824 A1 | 8/2006 | Bensky et al. | 707/3 |
| 2006/0218500 A1 | 9/2006 | Sauve et al. | 715/767 |
| 2006/0242557 A1 | 10/2006 | Nortis, III | 715/234 |
| 2006/0242575 A1 | 10/2006 | Winser | 715/530 |

| | | | |
|---|---|---|---|
| 2006/0242591 A1 | 10/2006 | Van Dok | |
| 2006/0294452 A1 | 12/2006 | Matsumoto | 715/236 |
| 2007/0050401 A1 | 3/2007 | Young et al. | 707/102 |
| 2007/0055936 A1 | 3/2007 | Dhanjal et al. | 715/700 |
| 2007/0055943 A1 | 3/2007 | McCormick et al. | |
| 2007/0061306 A1 | 3/2007 | Pell et al. | 707/3 |
| 2007/0061307 A1 | 3/2007 | Hartwell et al. | 707/3 |
| 2007/0061308 A1 | 3/2007 | Hartwell et al. | 707/3 |
| 2007/0061705 A1 | 3/2007 | Ammerlaan | |
| 2007/0094608 A1 | 4/2007 | Getsch | |
| 2007/0106951 A1 | 5/2007 | McCormack et al. | 715/764 |
| 2007/0143671 A1 | 6/2007 | Paterson et al. | 715/209 |
| 2007/0185826 A1 | 8/2007 | Brice et al. | 707/1 |
| 2007/0240057 A1 | 10/2007 | Satterfield et al. | 715/705 |
| 2007/0260996 A1 | 11/2007 | Jakobson | 715/781 |
| 2007/0279417 A1 | 12/2007 | Garg et al. | 345/440 |
| 2007/0300168 A1 | 12/2007 | Bosma et al. | 715/820 |
| 2008/0005686 A1 | 1/2008 | Singh | |
| 2008/0034304 A1 | 2/2008 | Feuerbacher et al. | 715/764 |
| 2008/0040682 A1 | 2/2008 | Sorenson et al. | 715/777 |
| 2008/0052670 A1 | 2/2008 | Espinosa et al. | |
| 2008/0141156 A1 | 6/2008 | Reik | |
| 2008/0178110 A1 | 7/2008 | Hill et al. | 715/771 |
| 2008/0263462 A1 | 10/2008 | Mayer-Ullmann | |
| 2009/0007003 A1 | 1/2009 | Dukhon et al. | 715/778 |
| 2009/0031295 A1 | 1/2009 | Zhao | |
| 2009/0064090 A1 | 3/2009 | Anonsen | |
| 2009/0083656 A1 | 3/2009 | Dukhon et al. | 715/781 |
| 2009/0100009 A1 | 4/2009 | Karp | |
| 2009/0205013 A1 | 8/2009 | Lowes | |
| 2009/0217192 A1 | 8/2009 | Dean et al. | 715/777 |
| 2009/0222763 A1 | 9/2009 | Dukhon et al. | 715/808 |
| 2009/0249339 A1 | 10/2009 | Larsson et al. | 718/100 |
| 2010/0060645 A1 | 3/2010 | Garg et al. | 345/440 |
| 2010/0180226 A1 | 7/2010 | Satterfield et al. | 715/777 |
| 2010/0191818 A1 | 7/2010 | Satterfield et al. | 709/206 |
| 2010/0211889 A1 | 8/2010 | Durazo et al. | 715/752 |
| 2010/0223575 A1 | 9/2010 | Leukart et al. | 715/779 |

FOREIGN PATENT DOCUMENTS

| | | |
|---|---|---|
| EP | 1 077 405 A2 | 2/2001 |
| EP | 1 672 518 | 6/2001 |
| EP | 1 223 503 | 7/2002 |
| EP | 1 376 337 | 2/2004 |
| EP | 1 462 999 A2 | 9/2004 |
| EP | 1 542 133 A2 | 6/2005 |
| EP | 1 835 434 A1 | 9/2007 |
| GB | 2 391 148 | 1/2004 |
| KR | 10-2002-0004723 | 1/2002 |
| KR | 10-2005-0023805 A | 3/2005 |
| KR | 10-2005-0036702 A | 4/2005 |
| KR | 10-200809921262 | 3/2008 |
| WO | WO 99/04353 | 1/1999 |
| WO | WO 99/27495 | 6/1999 |
| WO | WO 02/091162 A3 | 11/2002 |
| WO | WO 03/003240 A2 | 1/2003 |
| WO | WO 03/098500 | 11/2003 |
| WO | WO 2005/103900 | 11/2005 |
| WO | WO 2007/027737 A1 | 3/2007 |
| WO | WO2007/033159 A1 | 3/2007 |
| WO | WO2007/027737 A1 | 8/2007 |
| WO | WO2008/121718 A1 | 10/2008 |

OTHER PUBLICATIONS

Chinese Second Office Action dated Oct. 10, 2008 cited in Application No. 200510092141.1.
Chinese Second Office Action dated Oct. 17, 2008 cited in Application No. 200510092139.4.
U.S. Final Office Action dated Oct. 28, 2008 cited in U.S. Appl. No. 11/151,686.
Chinese Office Action dated Apr. 18, 2008 cited in Application No. 200510092142.6.
U.S. Final Office Action dated Jul. 24, 2008 cited in U.S. Appl. No. 11/151,686.
Microsoft Office Word 2003. Part of Microsoft Office Professional Edition 2003. Copyright 1983-2003 Microsoft Corporation.
U.S. Office Action dated Jul. 13, 2007 cited in U.S. Appl. No. 10/800,056.
U.S. Final Office Action dated Dec. 4, 2007 cited in U.S. Appl. No. 10/955,940.
U.S. Final Office Action dated Apr. 15, 2008 cited in U.S. Appl. No. 10/955,942.
Screendumps Microsoft Corporation, Microsoft Office Professional Edition 2003, 5 pgs.
U.S. Final Office Action dated Apr. 16, 2008 cited in U.S. Appl. No. 10/955,967.
Screendumps Microsoft Corporation, Microsoft Office Professional Edition 2003, 4 pgs.
U.S. Final Office Action dated May 28, 2008 cited in U.S. Appl. No. 10/982,073.
Chinese Official Action dated Mar. 21, 2008 cited in Chinese Application No. 200510092146.4.
Chinese Official Action dated Mar. 21, 2008 cited in Chinese Application No. 200510092139.4.
Philippine Official Action dated Apr. 21, 2008 cited in Philippine Application No. 1-2005-000405.
Philippine Official Action dated Apr. 21, 2008 cited in Philippine Application No. 1-2005-000406.
U.S. Office Action dated Jan. 28, 2008 cited in U.S. Appl. No. 10/836,154.
U.S. Office Action dated Sep. 26, 2007 cited in U.S. Appl. No. 11/151,686.
U.S. Office Action dated Oct. 9, 2007 cited in U.S. Appl. No. 10/982,073.
U.S. Final Office Action dated Apr. 29, 2008 cited in U.S. Appl. No. 10/955,941.
Habraken, Microsoft Office XP 8 in 1, published Jun. 5, 2001, http://proquest.safaribooksonline.com/0789725096/, 12 pgs.
Word 2002, Chapter 14; Paradigm Publishing Inc., copyright 2002; http://www.emcp.com/tech_tutorials/sig_irc/Signature_Word_Chapter_14.ppt, 21 pgs.
U.S. Appl. No. 11/151,686, filed Jun. 13, 2005 entitled "Floating Command Object".
U.S. Appl. No. 11/401,470, filed Apr. 10, 2006 entitled "Command User Interface for Displaying Selectable Functionality Controls in a Database Application".
U.S. Appl. No. 10/982,073, filed Nov. 5, 2004 entitled "Gallery User Interface Controls".
U.S. Appl. No. 10/607,020, filed Jun. 26, 2003 entitled "Side-by-Side Shared Calendars".
U.S. Appl. No. 10/741,407, filed Dec. 19, 2003 entitled "Methods, Systems, and Computer-Readable Mediums for Providing Persisting and Continuously Updating Search Folders".
U.S. Appl. No. 11/782,059, filed Jul. 24, 2007 entitled "Methods, Systems, and Computer-Readable Mediums for Providing Persisting and Continuously Updating Search Folders".
U.S. Appl. No. 10/836,154, filed Apr. 30, 2004 entitled "Combined Content Selection and Display User Interface".
U.S. Appl. No. 10/848,774, filed May 19, 2004 entitled "Automatic Grouping of Electronic Mail".
U.S. Appl. No. 10/851,442, filed May 21, 2004 entitled "Conversation Grouping of Electronic Mail Records".
U.S. Appl. No. 10/851,506, filed May 21, 2004 entitled "Adaptive Multi-Line View User Interface".
U.S. Appl. No. 10/955,941, filed Sep. 30, 2004 entitled "An Improved User Interface for Displaying Selectable Software Functionality Controls that are Relevant to a Selected Object".
U.S. Appl. No. 10/955,940, filed Sep. 30, 2004 entitled "An Improved User for Displaying Selectable Software Functionality Controls that are Contextually Relevant to a Selected Object".
U.S. Appl. No. 10/955,967, filed Sep. 30, 2004 entitled "Command User Interface for Displaying Selectable Software Functionality Controls".

U.S. Appl. No. 10/955,942, filed Sep. 30, 2004 entitled "An Improved User Interface for Displaying a Gallery of Formatting Options Applicable to a Selected Object".

U.S. Appl. No. 10/955,928, filed Sep. 30, 2004 entitled "User Interface for Providing Task Management and Calendar Information".

U.S. Appl. No. 10/800,056, filed Mar. 12, 2004 entitled "Method and System for Data Binding in a Block Structured User Interface Scripting Language".

Charles Rich et al., "Segmented Interaction History in a Collaborative Interface Agent," 1997, ACM, pp. 23-30.

Andrew Dwelly, "Functions and Dynamic User Interface," 1989, ACM, pp. 371-381.

Gordon Kurtenbach et al., "The Hotbox: Efficient Access to a Large Number of Menu-items," ACM, 1999, pp. 231-237, May 1999.

Charles Rich et al., "Adding a Collaborative Agent to Graphical User Interfaces," 1996, ACM, pp. 21-30.

Boyce, "Microsoft Outlook Inside Out," 2001, pp. 67, 68, 109, 110, 230, 231, 310, 316-318, 798.

Halvorson et al., "Microsoft Office XP Inside Out," 2001, pp. 1005-1009, 1015, 1023-1028, 1036-1039, 1093.

Riggsby et al., "Mastering Lotus Notes and Domino 6," 2003, pp. 135-139.

Riggsby et al., "Mastering Lotus Notes and Domino 6," 2003, pp. 135-138, 607-612.

Khare et al., "The Origin of (Document) Species," University of California, 1998, 9 pgs.

"Separate Structure and Presentation," http://www.webreference.com/html/tutorial5/1.html, Aug. 20, 1998, 4 pgs.

"The Style Attribute and CSS Declarations," http://www.webreference.com/html/tutorial5/2, Aug. 20, 1998, 3 pgs.

"What's Hot in Internet Services?" http://www.webreference.com/html/tutorial5/3, Aug. 20, 1998, 3 pgs.

"The Style Element & CSS Selectors," http://www.webreference.com/html/tutorial5/4.html, Aug. 20, 1998, 3 pgs.

http://www.webreference.com/html/tutorial5/5.html, Aug. 20, 1998, 3 pgs.

"ID & Class Selectors, Pseudoclasses," http://www.webreference.com/html/tutorial5/6.html, Aug. 20, 1998, 3 pgs.

http://www.webreference.com/html/tutorial5/7.html, Aug. 20, 1998, 3 pgs.

http://www.webreference.com/html/tutorial5/8.html, Aug. 20, 1998, 2 pgs.

"External Style Sheets," http://www.webreference.com/html/tutorial5/9.html, Aug. 20, 1998, 3 pgs.

Raman, "Cascaded Speech Style Sheets," 1997, 7 pgs.

"Primary Windows," http://www-03.ibm.com/servers/eserver/iseries/navigator/guidelines/primary.html, 23 pgs.

Schumaker, "User Interface Standards," http://msdn2.microsoft.com/en-us/library/aa217660(office.11.d=printer).aspx, Sep. 2001, 5 pgs.

Budinsky et al., "WebSphere Studio Overview," http://researchweb.watson.ibm.com/journal/sj/432/budinsky.html, May 6, 2004, 25 pgs.

Gordon Padwick, Using Microsoft Outlook 2000, Que, Sp. Ed., May 1999.

Becker et al., "Virtual Folders: Database Support for Electronic Messages Classification," Pontificia Universidade Catolica do Rio Grande do Sul, Porto Alegre, Brazil, pp. 163-170.

Goldberg et al., "Using Collaborative Filtering to Weave an Information Tapestry," Communication of the ACM, vol. 35, No. 12, pp. 61-70, Dec. 1992.

Liu et al., "Continual Queries for Internet Scale Event-Driven Information Delivery," IEEE Transactions on Knowledge and Data Engineering, vol. 11, Issue 1, pp. 610-628, 1999.

Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.

Marshall School of Business: "Workshop IV—Calendar," http://www.marshall.usc.edu/computing/PDF_Files/Outlook/Workshop4, PDF, Apr. 10, 2000, pp. 1-4.

M. Williams, "Programming Windows NT4: Unleashed," Sams Publishing, Indianapolis, 1996, pp. index & 167-185.

"Microsoft Outlook 2000: Introduction to Calendar," Version 2002.03.25, http://www.uakron.edu/its/learning/training/docs/Calendar032502.pdf, Mar. 25, 2002, pp. 1-52.

Screen Dumps of Microsoft Outlook (1999, pp. 1-3).

"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.

"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.

Microsoft Windows XP Professional, Version 2002, Service pack 2, 3 pgs.

Camarda, Using Microsoft Word 97, copyright 1997, QUE Corporation, pp. 412, 968.

Danish Written Opinion Appl. No. SG 200504508-3 dated Sep. 18, 2006.

Danish Search Report Appl. No. SG 200504475-5 dated Sep. 19, 2006.

NZ Application No. 541300, Examination Report dated Jul. 25, 2005.

Australian Search Report dated Jan. 16, 2007 cited in Singapore Application No. 200504474-8.

PCT Search Report dated Feb. 26, 2007 cited in International Application No. PCT/US2006/034993.

European Communicated dated Oct. 20, 2005 cited in EP Application No. 04102463.0-2211 PCT/.

Australian Written Opinion/Search Report cited in Singapore Application No. 200505257-6 mailed Feb. 12, 2007.

U.S. Office Action dated Dec. 23, 2003 cited in U.S. Appl. No. 09/896,384.

U.S. Notice of Allowance dated Aug. 24, 2004 cited in U.S. Appl. No. 09/896,384.

U.S. Office Action dated Apr. 27, 2006 cited in U.S. Appl. No. 10/800,056.

U.S. Final Office Action dated Oct. 19, 2006 cited in U.S. Appl. No. 10/800,056.

U.S. Office Action dated Apr. 12, 2007 cited in U.S. Appl. No. 10/851,506.

U.S. Office Action dated Jun. 4, 2007 cited in U.S. Appl. No. 10/955,940.

U.S. Office Action dated Jul. 26, 2006 cited in U.S. Appl. No. 10/741,407.

U.S. Final Office Action dated Jan. 23, 2007 cited in U.S. Appl. No. 10/741,407.

U.S. Notice of Allowance dated Apr. 10, 2007 cited in U.S. Appl. No. 10/741,407.

U.S. Office Action dated Jan. 4, 2007 cited in U.S. Appl. No. 10/607,020.

U.S. Office Action dated Jun. 14, 2007 cited in U.S. Appl. No. 10/836,154.

U.S. Office Action dated Jun. 21, 2007 cited in U.S. Appl. No. 10/955,928.

U.S. Notice of Allowance dated Jul. 5, 2007 cited in U.S. Appl. No. 10/607,020.

U.S. Office Action dated Jul. 11, 2007 cited in U.S. Appl. No. 10/955,941.

U.S. Office Action dated Jul. 11, 2007 cited in U.S. Appl. No. 10/955,967.

U.S. Office Action dated Jul. 11, 2007 cited in U.S. Appl. No. 10/955,942.

U.S. Final Office Action dated Dec. 21, 2007 cited in U.S. Appl. No. 10/851,506.

U.S. Final Office Action dated Dec. 28, 2007 cited in U.S. Appl. No. 10/800,056.

U.S. Final Office Action dated Jan. 8, 2008 cited in U.S. Appl. No. 10/955,928.

Chinese Office Action dated May 23, 2008 cited in Application No. 200510089514.X.

Philippine Official Action dated Jul. 31, 2008 cited in Philippine Application No. 12005000495.

European Communication dated Jun. 23, 2008 cited in European Application No. 04102463.9-2211/1517239.
Chinese First Office Action dated Apr. 11, 2008 cited in Application No. 200510092141.1.
Philippines Examiner's Action dated Sep. 12, 2008 cited in Application No. 1200500406.
Microsoft Office 11 Beta Layperson's Specification, Copyright 2002, Microsoft Corporation, 28 pgs.
FrontPage 11 Beta Layperson's Specification, Copyright 2002, Microsoft Corporation, 12 pgs.
Office 11 Beta Letter, Copyright 2002, Microsoft Corporation, 6 pgs.
Microsoft XDocs Beta Layperson Specification, Copyright 2002, Microsoft Corporation, 3 pgs.
Microsoft Publisher 11 Beta Layperson's Specification, Copyright 2002, Microsoft Corporation, 13 pgs.
U.S. Appl. No. 12/028,797, filed Feb. 9, 2008 entitled "Side-by-Side Shared Calendars".
U.S. Office Action dated Feb. 20, 2008 cited in U.S. Appl. No. 10/848,774.
U.S. Office Action dated Feb. 21, 2008 cited in U.S. Appl. No. 10/851,442.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141,143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
U.S. Appl. No. 12/372,386, filed Feb. 17, 2009 entitled "Command User Interface For Displaying Multiple Sections of Software Functionality Controls".
Chinese Office Action dated Apr. 3, 2009 cited in Appln No. 200510089514.X.
U.S. Office Action dated Mar. 18, 2009 in U.S. Appl. No. 11/401,470.
U.S. Office Action dated Apr. 7, 2009 in U.S. Appl. No. 10/955,940.
U.S. Office Action dated Dec. 11, 2008 cited in U.S. Appl. No. 10/982,073.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Chinese Second Office Action dated Nov. 21, 2008 cited in Appln No. 200510089514.X.
U.S. Official Action dated Jun. 19, 2008 cited in U.S. Appl. No. 10/851,506.
U.S. Official Action dated Jun. 20, 2008 cited in U.S. Appl. No. 10/955,928.
U.S. Official Action dated Jul. 17, 2008 cited in U.S. Appl. No. 10/955,940.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
Chilean Second Office Action dated Mar. 4, 2009 cited in Appln No. 2512-2005.
U.S. Office Action dated Apr. 28, 2009 in U.S. Appl. No. 12/028,797.
Nielsen, Jacob. "Tabs, Used Right," Alertbox, Sep. 17, 2007, http://www.useit.com/alertbox/tabs.html, 6 pages.

"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A₃D Tab Control Example," Jan. 4, 2008, http://microsoft.apress.com/asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.html, 2 pages.
Hepfner, Troy, "New SOCET CXP Interface Improves Usability," Sep. 2008, http://www.socetset/com/gxpmosaic/?p=95, 4 pages.
"TeeChart for .NET Charting Control," TeeChart for NET Steema Software. http://Iwww.teechart.net.
"Convert to Word 2007," http://www.regencytraining.com/word-2007-conversion.html, Regency Training and Consulting, 2 pages (Date Printed Apr. 21, 2008).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," Natural Language Engineering, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," Herschel CSDT Meeeting, pp. 1-21 (Sep. 2007).
Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).
Rice, F, "Customizing the 2007 Office System Document Inspector," http://msdn2.microsoft.com/en-us/library/aa338203(d=printer).aspx, 10 pages (May 2006).
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014.
Pogue, David. "Windows XP Home Edition: The Missing Manual," O'Reilly, 1st Edition, May 1, 2002, pp. 37, 38, 41.
Screendumps—Microsoft Office, Microsoft Corporation, Microsoft Office Professional Edition 2003, 13 pages.
PCT Search Report dated Feb. 6, 2007 cited in International Application No. PCT/US2006/035467.
International Search Report dated Nov. 27, 2007 in PCT/US2007/012573, 9 pages.
European Communication dated Jun. 9, 2009 cited in EP Application No. 07795391.7-1225.
International Search Report dated Nov. 2007 in PCT/US2007/012573, 9 pages.
Mexican Office Action dated Jun. 19, 2009 cited in Appln. No. PA/a/2005/007073.
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
European Communication dated Sep. 14, 2009 cited in Appln. No. 07795391.7-1225.
European Communication dated Sep. 15, 2009 cited in EP Application No. 09006972.5-2211.
U.S. Official Action dated Sep. 6, 2007 in U.S. Appl. No. 11/136,800.
U.S. Official Action dated May 30, 2008 cited in U.S. Appl. No. 11/430,562.
U.S. Official Action dated Jun. 27, 2008 cited in U.S. Appl. No. 11/430,416.
U.S. Official Action dated Jul. 9, 2009 cited in U.S. Appl. No. 11/136,800.
U.S. Official Action dated Aug. 4, 2009 in U.S. Appl. No. 10/955,967.
U.S. Official Action dated Aug. 4, 2009 in U.S. Appl. No. 10/955,942.

U.S. Official Action dated Aug. 18, 2009 in U.S. Appl. No. 11/782,059.
U.S. Official Action dated Sep. 23, 2009 in U.S. Appl. No. 11/401,470.
Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chinese Third Office Action dated Jun. 19, 2009 cited in Appln No. 200510092139.4.
Russian Office Action dated Jun. 24, 2009 cited in Appln No. 2005120363/28(023023).
U.S. Official Action dated Feb. 22, 2008 in U.S. Appl. No. 11/445,393.
U.S. Official Action dated Oct. 8, 2008 cited in U.S. Appl. No. 11/445,393.
U.S. Official Action dated Jun. 1, 2009 in U.S. Appl. No. 11/445,393.
U.S. Official Action dated Jun. 8, 2009 in U.S. Appl. No. 10/982,073.
U.S. Official Action dated Jun. 11, 2009 in U.S. Appl. No. 11/151,686.
U.S. Official Action dated Jun. 24, 2009 in U.S. Appl. No. 10/607,020.
PCT Search Report and Written Opinion dated Dec. 29, 2009 cited in International Application No. PCT/US2009/046344.
U.S. Final Office Action dated Jan. 6, 2010 cited in U.S. Appl. No. 10/607,020.
U.S. Official Action dated Jan. 25, 2010 in U.S. Appl. No. 10/982,073.
U.S. Appl. No. 12/414,317, filed Mar. 30, 2009 entitled "Scope-Based Extensibility for Control Surfaces".
European Search Report mailed Dec. 2, 2008, having Application No. EP 06 79 0087.
International Search Report and Written Opinion mailed Jan. 9, 2007, Application No. PCT/US2006/033809.
International Search Report mailed Aug. 7, 2009, Application No. PCT/US2009/034618.
European Office Action mailed Mar. 9, 2009, Application No. 06790087.8.
U.S. Official Action dated Sep. 15, 2009 in U.S. Appl. No. 11/217,071.
Padwick, Gordon "Using Microsoft Outlook 2000," 1999 Que Publishing, pp. 530-533.
Slovak, Ken. "Absolute Beginner's Guide to Microsoft Office Outlook 2003." 2003, Que Publishing, pp. 237-241.
Microsoft Press, Microsoft Computer Dictionary, Microsoft Press, Fifth Edition, pp. 374, 382.
Riggsby, McCoy, Haberman and Falciani, "Mastering Lotus Notes and Domino 6." 2003, pp. 18, 22, 33-35, 47, 122, 123, 215-241, 378.
"About Google Desktop Search", http://www.desktop.google.com/about.html, Oct. 15, 2004, 8 pages.
Find any file or email on your PC as fast as you can type!, http://www.xl.com, 2003, 1 page.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
"Primary Windows", http://www-03.ibm.com/servers/eserver/iseries/navigator/guidelines/primary.html, 23 pages.
Dennis Schumaker, "User InterfaceStandards", http://msdn2.microsoft.com/en-us/library/aa217660(office.11.d=printer).aspx, Sep. 2001, 5 pages.
"WebSphere Studio Overview", http://researchweb.watson.ibm.com/journal/sj/432/budinsky.html, May 6, 2004, 25 pages.
"User Interface Architecture," Data Master 2003, 2 pages.
Kim et al., "Migrating Legacy Software Systems to CORBA based Distributed Environments through an Automatic Wrapper Generation Technique," http://www.cs.colostate.edu/~bieman/Pubs/KimBieman00.pdf, accessed on Jan. 28, 2009, 6 pages.
Selca, Viki "Customizing the Office Fluent User interface in Access 2007," Microsoft Corporation, Dec. 2006, 22 pages.
Parry; "*CREWS: A Component-Driven, Run-Time Extensible Web Service Framework*"; http://eprints.ru.ac.za/74/01/Parry-MSC.pdf; Dec. 2003; 103 Pgs.
Louw, et al.; "*Extensible Web Browser Security*"; http://www.cs.uic.edu/~venkat/research/papers/extensible-browser-dimva07.pdf; pp. 1-20.
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
Screendumps—Microsoft Office (Microsoft Corporation, Microsoft Office Professional Edition 2003; 16 pages).
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
U.S. Official Action dated Jan. 20, 2010 in U.S. Appl. No. 10/955,967.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Israeli Office Action dated Sep. 6, 2009 cited in Appln No. 169716.
Israeli Office Action dated Sep. 7, 2009 cited in Appln No. 169718.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 28, 2009 cited in Appln No. 09006972.5-2211.
Chinese Office Action dated Oct. 16, 2009 cited in Appln No. 200510092142.6.
U.S. Official Action dated Nov. 24, 2009 in U.S. Appl. No. 11/445,393.

U.S. Appl. No. 12/574,256, filed Oct. 6, 2009 entitled "Modifying a Chart".
Perronne et al. "Building Java Enterprise Systems with J2EE", Publisher: Sams, Pub Date: Jun. 7, 2000 (pp. 1-8).
Israeli Office Action dated Oct. 12, 2009 cited in Appln No. 170668.
Russian Office Action dated Oct. 26, 2009 cited in Appln No. 2005120363/09(023023).
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Appl. No. 12/769,787 filed Apr. 29, 2010 entitled "Conversation Grouping of Electronic Mail Records".
U.S. Appl. No. 12/777,287 filed May 11, 2010 entitled "User Interface for Providing Task Management and Calendar Information".
U.S. Appl. No. 11/217,071 filed Aug. 30, 2005 entitled "Markup Based Extensibility for User Interfaces".
Clifton, The Application Automation layer—Using XML to Dynamically Generale GUI Elements—forms and controls, The Code Project, Jun. 2003, pp. 1-37.
Australian Office Action dated May 28, 2010 cited in Appln No. 2005202717.
U.S. Official Action dated Mar. 30, 2010 in U.S. Appl. No. 11/217,071.
U.S. Official Action dated Apr. 15, 2010 in U.S. Appl. No. 11/823,999.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
U.S. Official Acton dated Jun. 22, 2010 in U.S. Appl. No. 11/430,562.
U.S. Official Action dated Jun. 23, 2010 in U.S. Appl. No. 10/955,940.
U.S. Official Action dated Jul. 1, 2010 in U.S. Appl. No. 11/782,059.
U.S. Official Action dated Jul. 6, 2010 in U.S. Appl. No. 10/955,967.
ScreenShot of MS_Office_2003; (Microsoft Corporation, Microsoft Office Professional Edition 2003; 6 pages).
NZ Application No. 541301, Examination Report dated Jul. 25, 2005.
NZ Application No. 541299, Examination Report dated Jul. 25, 2005.
PCT Written Opinion and Search Report dated Jan. 9, 2007 cited in International Application No. PCT/US2006/033809.
European Office Action mailed Mar. 9, 2009, cited in Appln No. 06790087.8.
Russian Office Action dated Oct. 30, 2009 cited in Appln No. 2005125837/09.
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/U52009/046341.
Chilean Second Office Action dated Dec. 4, 2009 cited in Appln No. 1768-2005.
Russian Office Action dated Dec. 28, 2009 cited in Appln No. 2005125836/09.
U.S. Official Acton dated Nov. 13, 2008 in U.S. Appl. No. 11/430,562.
U.S. Official Action dated Jan. 9, 2009 in U.S. Appl. No. 11/430,561.
U.S. Official Acton dated Jun. 19, 2009 in U.S. Appl. No. 11/430,562.
U.S. Official Action dated Aug. 17, 2009 in U.S. Appl. No. 11/430,561.
U.S. Official Acton dated Jan. 7, 2010 in U.S. Appl. No. 11/430,562.
U.S. Appl. No. 12/814,084 filed Jun. 11, 2010 entitled "Merging Modifications to User Interface Components While Preserving User Customization".
U.S. Appl. No. 12/331,451 filed Dec. 10, 2008 entitled "Multi-Layered Storage and Management of Software Components" (Microsoft case).
Halvorson et al., Microsoft Office Professional Official Manual, Aug. 20, 2002, 10 pgs.
Mexican Office Action dated Aug. 12, 2010 cited in Appln No. 2005/008354.
U.S. Official Action dated Aug. 2, 2010 in U.S. Appl. No. 10/955,942.
U.S. Official Action dated Aug. 6, 2010 in U.S. Appl. No. 11/401,470.
U.S. Official Action dated Sep. 21, 2010 in U.S. Appl. No. 11/217,071.
U.S. Official Action dated Sep. 27, 2010 in U.S. Appl. No. 10/836,154.
PCT Written Opinion and Search Report dated Sep. 2, 2010 cited in International Application No. PCT/US2010/021888.
Malaysian Substantive Examination Adverse Report dated Sep. 30, 2010 cited in Appln No. PI 20052959.
Australian Office Action dated Oct. 21, 2010 cited in Appln No. 2006284908.
Chinese Second Office Action dated Oct. 29, 2010 cited in Appln No. 200680030421.2.
U.S. Appl. No. 12/954,952 filed Sep. 29, 2010 entitled "Gallery User Interface Controls".
Bellavista et al., "A Mobile Infrastructure for Terminal, User, and Resource Mobility", Network Operations and Management Symposium, NOMS 2000, pp. 877-890, IEEE/IFIP.
"Microsoft Office Professional Plus 2007", © 2006, Microsoft Corporation; 66 pgs.
U.S. Official Action dated Nov. 9, 2010 in U.S. Appl. No. 10/607,020.
U.S. Official Action dated Nov. 22, 2010 in U.S. Appl. No. 11/782,059.
U.S. Official Action dated Nov. 26, 2010 in U.S. Appl. No. 12/753,923.
European Search Report dated Nov. 25, 2008 cited in Application EP 06 79 0087.
Mexican Office Action dated May 4, 2010 cited in Appln No. 2005/008354.
Israeli Office Action dated Jul. 5, 2010 cited in Appln No. 169718.
Israeli Office Action dated Oct. 28, 2010 cited in Appln No. 169716.
U.S. Official Action dated Dec. 8, 2010 in U.S. Appl. No. 10/851,506.
U.S. Official Action dated Dec. 8, 2010 in U.S. Appl. No. 10/955,967.

* cited by examiner

CROSS VERSION AND CROSS PRODUCT USER INTERFACE

BACKGROUND

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects. Modern database applications allow users to store, organize and exchange large amounts of data.

Most software applications provide one or more graphical user interfaces through which a user enters and edits data and from which the user accesses and utilizes various functionalities of the associated software application. A typical user interface includes a work area in which data may be entered, edited, and reviewed. Additionally, user interfaces typically include one or more buttons and/or controls operative for selecting the functionalities provided by the associated software application. For example, buttons or controls may be provided for printing or saving a document, buttons or controls may be provided for applying formatting properties to aspects of a document, and the like.

Often, a third party software developer creates a software add-in that may be added to an existing application for providing functionality not available from the existing application. For example, an add-in software application may provide a feature to a word processing application for adding specialized footnotes or endnotes to a document. Typically, in addition to providing additional functionality, the add-in application provides one or more new user interface components to the existing application user interfaces, such as a new toolbar, button(s), or other control(s), for accessing the additional functionality. A problem occurs when new versions of the existing applications are created in which user interfaces are changed so that the add-in user interfaces are no longer compatible with the user interfaces of the existing software applications. Unless the developers of the add-in applications change their add-in user interfaces to match the new user interfaces of the existing applications, the functionality of the add-in applications may not be exposed to users.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by providing methods, systems, and computer products for exposing the functionalities provided in add-in software application user interfaces in otherwise incompatible user interfaces of existing applications (hereinafter referred to as "parent applications") to which the add-in applications are applied. According to an embodiment of the invention, when a user interface of a parent application is modified such that a user interface of an add-in application applied to the parent application is not compatible with the parent application user interface, buttons or controls associated with functionalities of the add-in application are added to the new or modified parent application user interface in a manner that are consistent with the visual and functional properties of the present parent user interface.

The present (new or otherwise modified) user interface of the parent application is run in the foreground by the parent application and is visible to users. A prior user interface of the parent application to which the add-in application user interface is compatible and to which the add-in application user interface components (e.g., buttons or controls) are added is run in a background of the parent application, but is not visible to users. Buttons or controls associated with the add-in application that are added to the new or modified parent application user interface are linked to corresponding buttons or controls of the add-in application that are added to and run in the background prior user interface of the parent application. For example, if a menu command is added to the background prior user interface by an add-in application, then a corresponding command or control is added to the present user interface in a manner that is consistent with the present user interface layout and functionality.

User interface components added to or changed in the background running prior user interface are mapped or linked to user interface components added to the present user interface by addition of the add-in application to the parent application. When a user selects a user interface component from the present user interface that is associated with an add-in application functionality, the corresponding user interface component in the background running prior user interface is selected via a link between the add-in user interface component in the present parent application user interface and the corresponding user interface component in the background prior user interface component. In response, the associated functionality of the add-in application is executed. Thus, a developer of the add-in application does not have to update or modify the add-in application user interface components to comply with a new or modified user interface of the parent application that otherwise would be incompatible with the add-in application user interface.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to methods, systems, and computer products for exposing functionalities of an add-in software application in a user interface of a parent application to which the add-in software application is applied where user interface components of the add-in application are not compatible with a present version of the user interface provided by the parent application. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
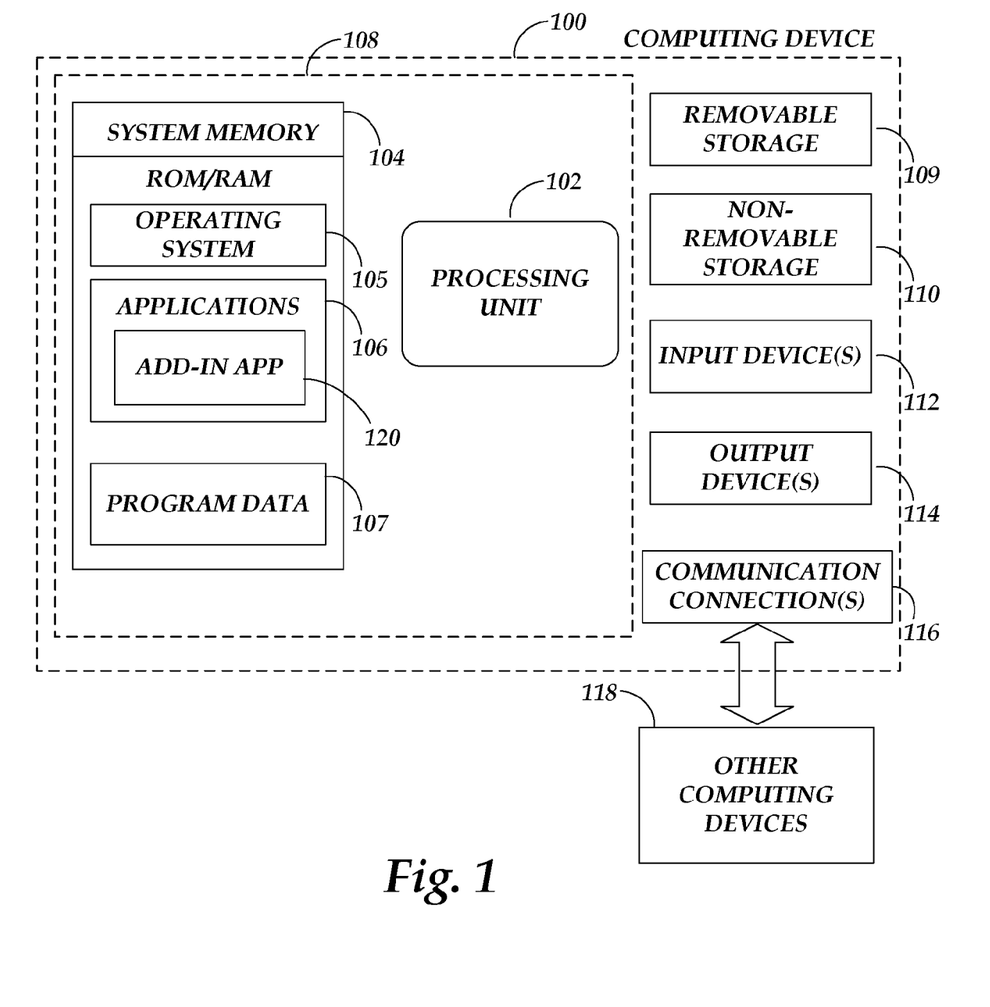
FIG. 1 illustrates an exemplary computing operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106, 120 and may include program data 107. This basic configuration is illustrated in FIG. 1 by those components within dashed line 108.

According to embodiments of the invention, the application 106 may comprise many types of programs, such as an electronic mail program, a calendaring program, an Internet browsing program, and the like. An example of such programs is OUTLOOK® manufactured by MICROSOFT CORPORATION. The application 106 may also comprise a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. According to embodiments of the present invention, the applications 106 are illustrative of any software application for which a user interface may be changed such that it is no longer compatible with an add-in user interface of an add-in software application applied to the applications. The add-in software application 120 may comprise any software application that may be added to the applications 106 for enhancing or providing additional functionality to the applications 106 as described herein. In addition, an add-in software application, as described herein, may include document-based software solutions, for example, a spreadsheet document that includes attached toolbars, or a word processing document that contains a macro or other code that adds a toolbar with buttons or controls.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 1118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
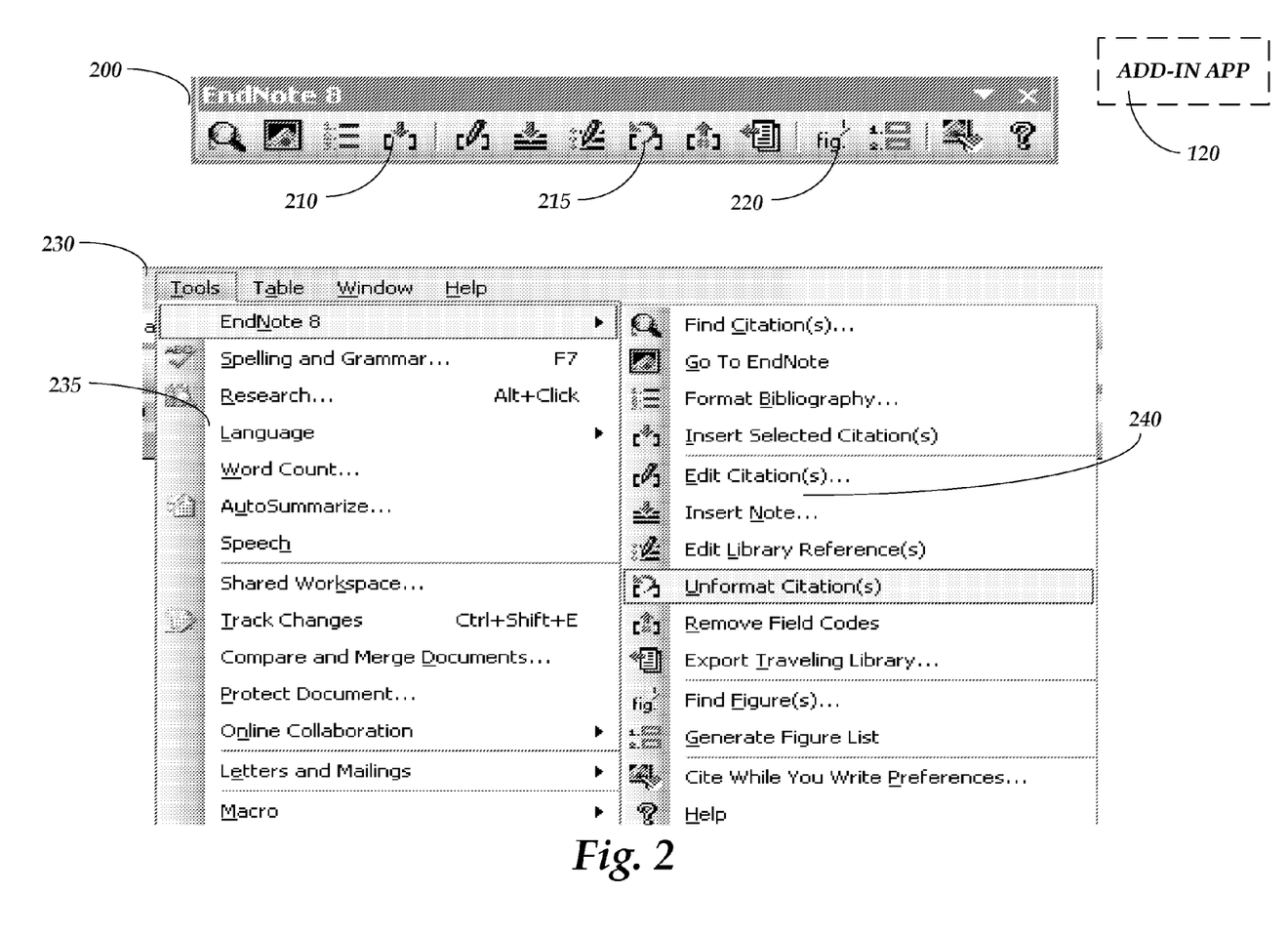
FIG. 2 illustrates a computer screen display of an add-in user interface toolbar and drop-down menu.

Referring now to FIG. 2, a user interface toolbar 200 and a user interface drop-down menu 230 of an example add-in software application 120 are illustrated for adding additional functionality and user interface components to an existing or parent software application. For example, a parent software application may be a word processing application, a spreadsheet application, a slide presentation application, a notes application, an electronic mail application, a calendaring application, and the like for which a third party software application developer creates an add-in application 120 that may be applied to the parent application for adding additional functionality and user interface components. The user interface components illustrated in FIG. 2 show example functions associated with an add-in application for providing enhanced footnotes and endnotes functionalities to a parent application. As should be appreciated, the user interface components illustrated in FIG. 2 are for purposes of example only and are not limiting or restrictive of the number and types of user interface components that may be added to a parent application by an associated add-in application 120.

As illustrated in FIG. 2, the add-in application user interface includes a toolbar 200 having a variety of toolbar command buttons or controls 210, 215, 220. According to embodiments of the present invention, when the add-in application 120 associated with the user interface component 200 is added to a parent software application, the toolbar 200 is added to an existing toolbar set or other user interface component of the parent application. A drop-down menu of tools 230 is illustrated having a variety of menu commands such as the language command 235 and the insert note command 240. The drop-down menu of tools may be deployed by selecting one of the toolbar commands 210, 215, 220 or other control from the toolbar 200.

According to prior methods and systems, if the user interface components 200, 230 illustrated in FIG. 2 and associated with an add-in application 120 are added to the user interface components of a parent application where the added user interface components are compatible with the user interface components of the parent application, the added user interface components may be displayed in the parent application user interface in a manner consistent with the existing user interface components of the parent application. For example, if the parent application user interface includes a toolbar of functionality buttons or controls, the toolbar controls of the add-in toolbar 200 may be added to the toolbar set of the parent application, or the toolbar 200 may be appended to or otherwise connected with a toolbar of the parent application user interface.

However, when the user interface components of the parent application 106 are modified as often occurs in a new version of the parent application such that the user interface components of the add-in application 120 are no longer compatible with the organization, layout, and functionality of the user interface components of the parent application, the add-in application user interface components may not be surfaced to a user of the parent application. That is, the add-in application user interface components may not be visually presented in the user interface of the parent application for selection by a user. For example, if a new or modified user interface of the parent application does not utilize toolbars of functionality buttons or controls, the parent application user interface may not have an area or section into which the buttons or controls of an add-in application toolbar may be added or to which an add-in application toolbar may be appended or otherwise associated.

Figure 3:
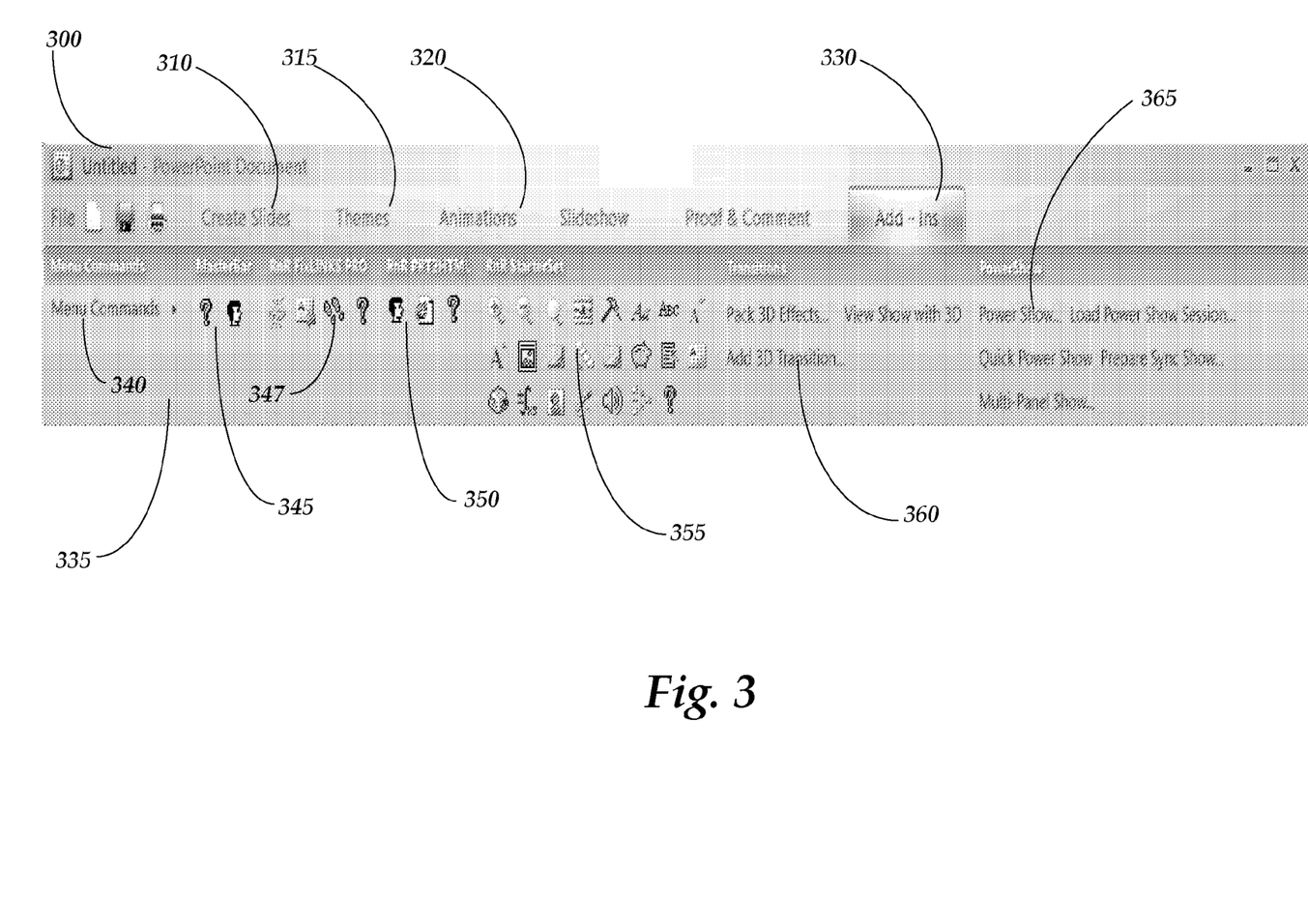
FIG. 3 illustrates a computer screen display of a new or modified user interface of a parent software application to which user interface components are added for mapping to the components of an add-in application user interface that is not compatible with the new or modified parent application user interface.

Referring now to FIG. 3, a new or modified user interface 300 of a parent application 106 is illustrated which is not compatible with the add-in application user interface components illustrated in FIG. 2. As described below, the user interface 300 of an associated parent application does not include a toolbar of functionality buttons or controls and does not include drop-down menus or submenus of commands associated with toolbar buttons or controls. Thus, the present (new or modified) user interface 300 of the parent application does not have a section or area into which components of the add-in application user interface, illustrated in FIG. 2, may be placed for surfacing to a user in a manner that is consistent with the present user interface 300 of the parent application.

According to FIG. 3, the example user interface 300 of the parent application 106 is a tab-based user interface containing one or more tabs 310, 315, 320 associated with corresponding tasks that may be performed using the functionalities of the parent software application. The user interface 300 illustrated in FIG. 3 is associated with an example slide presentation application. For example, the tab 310 is associated with a task of creating slides. The tab 315 is associated with a task of applying themes to created slides. The tab 320 is associated with applying animations to created slides. When a given tab 310, 315, 320 is selected, a user interface component (hereafter UI component) 335 displayed beneath the tabs 310, 315, 320 is populated with logical groupings of functionality buttons, or controls for performing a task associated with the selected tab.

The logical groupings of functionality buttons or controls may contain one or more buttons or controls associated with a subtask under the main task. For example, if a task associated with the creating slides tab 310 is selected, the UI component 335 may be populated with one or more logical groupings of functionality buttons or controls for creating slide presentation slides. One logical grouping of buttons or controls in the UI component 335 may be associated with generating new slides. A second logical grouping may include buttons or controls associated with display orientations of created slides. If a different tab 315 is selected for providing functionalities associated with a different task that may be performed with the example slide presentation application, the UI component 335 will be populated with one or more logical groupings of functionality buttons or controls associated with the second selected tab and associated task.

As should be appreciated, the user interface 300 illustrated in FIG. 3 is for purposes of example only and is not limiting or restrictive of the number and types of user interfaces applicable to embodiments of the present invention. For example the user interface 300 is illustrative of a user interface that may be utilized for a word processing application, a slide presentation application, a spreadsheet application, a notes application, an electronic mail application, a calendaring application, and the like. As should be appreciated, individual functionality commands and controls illustrated in the user interface 300 would be different based on the different parent applications for which the user interface 300 is provided.

According to embodiments of the present invention, in order to utilize the functionality of the add-in application 120, and in order to present user interface components in the new user interface 300 associated with the add-in application, a new component 330, for example the "Add-ins" tab, is created to surface user interface components in the present user interface that are added by the add-in application. As illustrated in FIG. 3, selection of the Add-ins tab 330 causes a population in the UI component 335 of one or more functionality buttons or controls corresponding to functionalities provided by the add-in application 120 that would otherwise be provided in the add-in application user interface components illustrated in FIG. 2. According to one embodiment, the functionality buttons or controls associated with the add-in application 120 may be grouped in logical groupings of buttons or controls in the UI component 335 as is done for functionalities of the parent application, as described above. That is, each of the buttons or controls associated with the functionalities of the add-in application may be organized into logical groupings in the UI component 335 so that the user receives a user interface visual experience for the add-in application functionalities that is consistent with the user interface experience for functionalities provided by the parent application. As should be appreciated, if the visual layout and presentation of the new user interface 300 is of a different layout and presentation, then buttons or controls associated with add-in application functionalities may be added according to the different layout or presentation.

According to another embodiment, the UI component 335 may be populated with icons associated with buttons or controls 210, 215, 220 contained in the add-in application user interface toolbar 200. Selection of one of the buttons or controls 210, 215, 220 displayed in the UI component 335 may cause the UI component 335 to then be populated with one or more logical groupings of functionality buttons or controls normally displayed in the drop-down menu 230 of command menus available under a selected toolbar button or control.

According to another embodiment, the Add-ins tab 330 may selectively provide in the UI component 335 logical groupings of functionality buttons or controls associated with different add-in applications. For example, a first logical grouping 345 may be associated with functionality buttons or controls for a first add-in application 120, a second logical grouping 347 may include functionality buttons or controls associated with a second add-in application, and so on. For example, a first application add-in may provide enhanced functionality for providing endnotes and footnotes to a word processing or slide presentation application. A second application add-in may provide functionality for desktop publishing formatting properties for applying to a word processing application, slide presentation application, or spreadsheet application, and the like.

Figure 4:
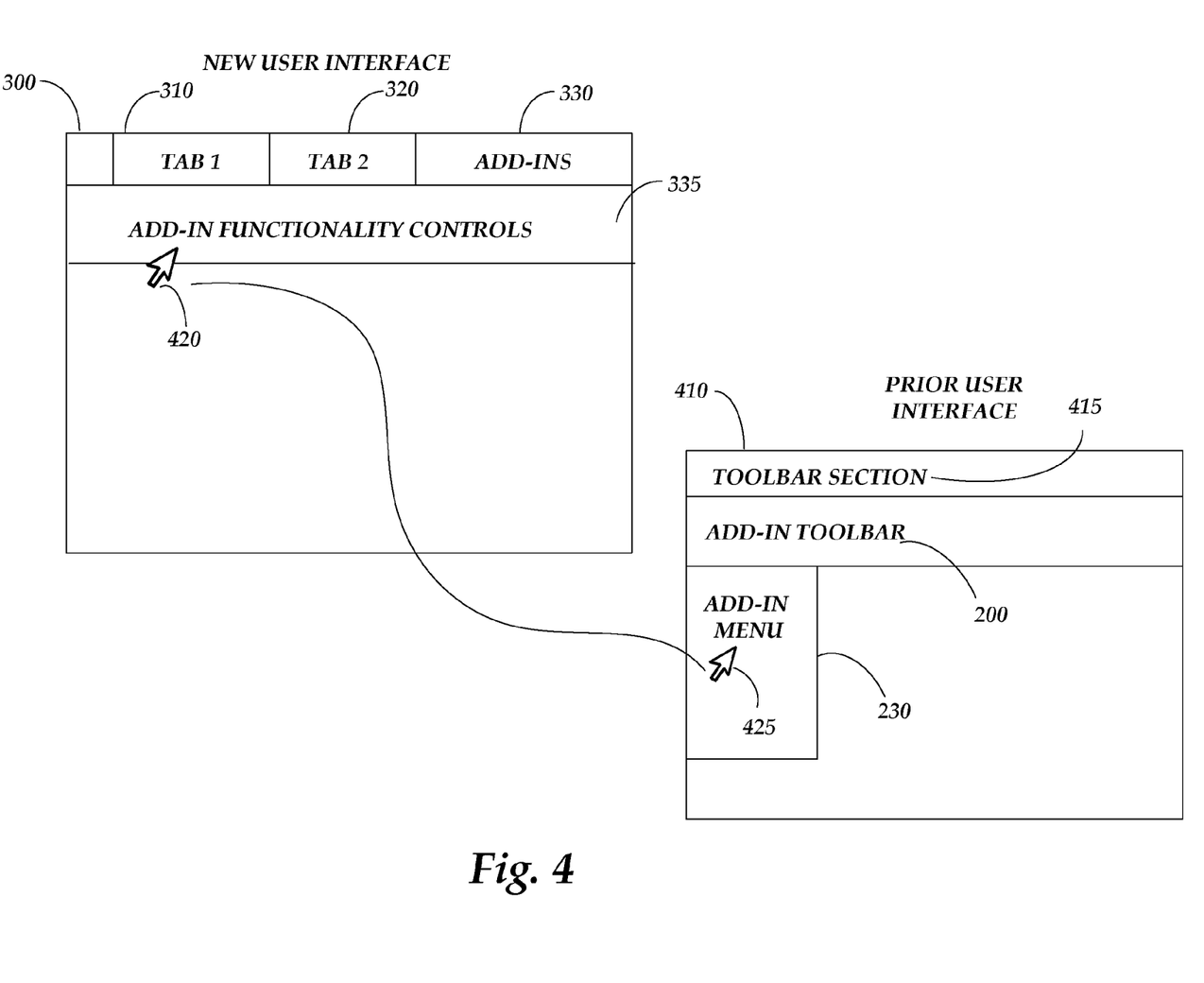
FIG. 4 is a simplified block diagram illustrating interaction between the components of a parent application user interface and the components of a background running prior user interface to which add-in application user interface components have been applied.

Referring now to FIG. 4, as briefly described above, in order to activate functionalities of the add-in application, the add-in application user interface components, as illustrated in FIG. 2, are applied to a prior version of the parent application user interface 410. The prior version user interface 410 along with the applied add-in user interface components 200, 230 is run by the parent application as a background or shadow user interface 410 and is not visible to users. That is, the user interface 410, illustrated in FIG. 4, is a copy of the user interface previously operated by the parent application for which the user interface components of the add-in application were designed. For example, as illustrated in FIG. 4, the endnote toolbar 200 of the example add-in application appends to a toolbar section 415 of the prior user interface 410, and the add-in application drop-down menu 230 is illustrated deployed beneath the toolbar 200.

According to embodiments of the present invention, when new user interface components are added to or changed in the background running prior user interface by addition of the add-in application, corresponding user interface components are added to the present user interface of the parent application, and the new user interface components added to or changed in the background running prior user interface are mapped or linked to user interface components added to the present user interface of the parent application. According to one embodiment, buttons or controls in the parent application user interface are linked to corresponding buttons or controls in the background user interface 410 by embedding in a given button or control in the parent user interface 300 a path to an associated button or control in the background user interface 410. A selection of a button or control from the parent user interface 300 causes a call along the path to the corresponding button or control in the background user interface that causes selection or execution of the corresponding button or control in the background user interface 410.

As described above, when the parent application is running, the prior version user interface 410 is operated in a background mode so that it is not visible to a user. When a button or control is selected from the new user interface 300, for example, by a mouse cursor click 420, the corresponding functionality button or control in the background running prior user interface 410 is selected for actually executing the associated functionality of the add-in application. For example, if a button or control associated with a formatting functionality is selected in the new or present user interface 300 that is associated with a formatting functionality of an add-in application 120, the button or control in the prior user interface 410 that is mapped to the selected button or control is automatically selected as if selected by an example mouse cursor click 425. In response, the associated functionality of the add-in application is executed.

According to the present invention, the add-in application is not aware that the selected and executed functionality was executed by selection of a button or control displayed in the new or present user interface 300 of the parent application. That is, the add-in application is only aware that a button or control associated with the executed functionality has been selected from the user interface components 200, 230 provided by the add-in application. Thus, the add-in application does not have to be modified or updated to be compatible with the new or modified user interface components of the parent application.

According to an alternative embodiment of the present invention, if the user interface of the add-in user interface components 200, 230 are operative to function as standalone user interfaces without being integrated into the parent application user interface, the add-in user interface components 200, 230 are not applied to the prior user interface 410, as illustrated in FIG. 4, but the user interface components 200, 230 are run as standalone background user interface components associated with the add-in application 120. As described above, user interface components added to the standalone background add-in user interface are replicated/propagated to the new parent user interface and the two versions of the component are linked together. When a user interface component in the parent user interface 300 is selected that corresponds to a user interface component in the standalone components 200, 230, the corresponding functionality of the add-in application is executed.

It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method for exposing functionalities of an add-in software application via a modified parent user interface, the method comprising:

providing a first set of functionalities of a parent software application via a prior parent user interface;

providing a second set of functionalities of the add-in software application to the parent software application via an add-in user interface and a first set of components of the add-in user interface which are integrable with a second set components of the prior parent user interface;

receiving the modified parent user interface, wherein the modified parent user interface is a modified version of the prior parent user interface;

determining the first set of components of the add-in user interface are not integrable with a modified set of components of the modified parent user interface;

integrating, in response to the determining, the first set of components of the add-in user interface with the prior parent user interface into which the first set of components of the add-in user interface are integrable, wherein integrating the first set of components of the add-in user interface with the prior parent user interface into which the first set of components of the add-in user interface are integrable comprises running the prior parent user interface including the integrated add-in user interface components as a background user interface that is not visually displayed;

generating a plurality of selectable components in the modified parent user interface corresponding to the integrated add-in user interface components which are integrated into the prior parent user interface, wherein generating the plurality of selectable components in the modified parent user interface comprises:

creating, in the modified parent user interface, a selectable add-in component comprising a plurality of selectable controls associated with the second set of functionalities of the add-in software application, the selectable add-in component populating, upon selection, a portion of the modified parent user interface with the plurality of selectable controls, and grouping the plurality of selectable controls associated with the second set of functionalities of the add-in software application into logical groupings comprising icons associated with the plurality of selectable controls, wherein grouping the plurality of selectable controls associated with the second set of functionalities of the add-in software application into the logical groupings comprises laying out the plurality of selectable controls associated with the second set of functionalities of the add-in software application consistently with a layout of the modified parent user interface;

linking each generated selectable component in the modified parent user interface with each corresponding integrated add-in user interface component;

displaying the modified parent user interface; and selecting, in response to a selection of the generated selectable component in the modified parent user interface, the integrated add-in user interface component in the background user interface corresponding to the selected generated selectable component in the modified parent user interface.

2. The method of claim 1, wherein displaying the modified parent user interface comprises:

exposing the first set of functionalities of the parent software application, and exposing each generated selectable component of the modified parent user interface corresponding to each integrated add-in user interface component that is integrated into the prior parent user interface.

3. The method of claim 1, wherein linking each generated selectable component in the modified parent user interface with each corresponding integrated add-in user interface component includes embedding in each generated selectable component in the modified parent user interface a path to the corresponding integrated add-in user interface component.

4. The method of claim 3, wherein selecting the integrated component corresponding to the selected generated selectable component in the modified parent user interface includes passing an execution call along the path from the selected generated component in the modified parent user interface to the corresponding integrated add-in user interface component.

5. The method of claim 2, further comprising:

receiving a selection of the generated selectable component in the modified parent user interface that is linked to the corresponding integrated add-in user interface component; and activating, in response to receiving the selection of the generated selectable component in the modified parent user interface that is linked to the corresponding integrated add-in user interface component, the corresponding selectable control of the plurality of selectable controls.

6. The method of claim 5, further comprising executing a first functionality of the second set of functionalities of the add-in software application associated with the activated corresponding selectable control.

7. The method of claim 2, wherein running the prior version of the parent user interface including the integrated add-in user interface components as a background user interface that is not visually displayed comprises, running the prior version of the parent user interface while displaying the modified parent user interface, wherein any one of the second set of functionalities of the add-in software application that is provided to the parent software application is executed by the selection of the associated selectable control of the modified parent user interface that corresponds to the integrated add-in user interface component which is integrated into the prior parent user interface.

8. A method for exposing functionalities of an add-in software application via a parent software application user interface, the method comprising:

receiving a parent software application providing a first set of functionalities via the parent user interface;

receiving the add-in software application to be added to the parent software application, the add-in software application including an add-in user interface providing a second set of functionalities of the add-in software application, wherein the add-in user interface includes a first set selectable components each of which executes an associated functionality of the second set of functionalities of the add-in software application, the first set of selectable components of the add-in user interface not being compatible with the parent user interface;

integrating the first set of selectable components of the add-in user interface with a prior version of the parent user interface with which the first set of selectable components of the add-in user interface are compatible, wherein integrating the first set of selectable components of the add-in user interface with a prior version of the parent user interface with which the first set of components of the add-in user interface are compatible comprises running the prior version of the parent user interface including the integrated add-in user interface components as a background user interface that is not visually displayed;

generating a second set of selectable components in the parent user interface each corresponding to one of the integrated add-in user interface components, wherein generating the second set of selectable components in the parent user interface comprises:

creating, in the parent user interface, a selectable add-in component comprising a plurality of selectable controls associated with the second set of functionalities of the add-in software application, the selectable add-in component populating, upon selection, a portion of the parent user interface with the plurality of selectable controls, and grouping the plurality of selectable controls associated with the second set of functionalities of the add-in software application into logical groupings comprising icons associated with the plurality of selectable controls, wherein grouping the plurality of selectable controls associated with the second set of functionalities of the add-in software application into the logical groupings comprises grouping the plurality of selectable controls associated with the second set of functionalities of the add-in software application in a consistent manner with a layout of the parent user interface;

linking each generated selectable component of the second set of selectable in the parent user interface with each corresponding integrated add-in user interface component;

displaying the parent user interface; and selecting, in response to a selection of at least one generated selectable component in the parent user interface, the corresponding integrated add-in user interface component in the background user interface.

9. The method of claim 8, wherein linking each generated selectable control of the second set of selectable controls in the parent user interface with each corresponding integrated add-in user interface component includes embedding in each generated selectable control in the parent user interface a path to each corresponding integrated add-in user interface component.

10. The method of claim 9, wherein selecting the corresponding integrated add-in user interface component includes passing an execution call along the path from the selected generated control component in the parent user interface to the at least one corresponding integrated add-in user interface component.

11. The method of claim 8, wherein displaying the parent user interface further comprises, exposing the first set of functionalities of the parent software application and exposing each generated selectable control in the parent user interface corresponding to each selectable control in the add-in user interface; and wherein running the add-in user interface as a background user interface that is not visually displayed further comprises, executing the functionality of the first second set of functionalities of the add-in software application that is configured to be executed via the add-in user interface by selection of the associated selectable control of the parent user interface that corresponds to the integrated add-in user interface component which is integrated into the prior version of the parent user interface.

12. The method of claim 11, further comprising:

receiving the selection of the generated selectable control component in the parent user interface that is linked to the corresponding integrated add-in user interface component;

activating, in response to receiving the selection of the generated selectable component in the parent user interface that is linked to the corresponding integrated add-in user interface component, the corresponding selectable control of the plurality of controls; and executing a first functionality of the second set of functionalities of the add-in software application associated with the activated corresponding selectable control.

13. A non-transitory computer readable storage medium which stores a set of instructions which when executed by a computer performs a method for exposing functionalities of an add-in software application via a modified parent user interface, the method executed by the set of instructions comprising:

providing a first set of functionalities of a parent software application via a prior parent user interface;

providing a second set of functionalities of the add-in software application to the parent software application via an add-in user interface and a first set of components of the add-in user interface which are integrable with a second set components of the prior parent user interface;

receiving the modified parent user interface, wherein the modified parent user interface is a modified version of the prior parent user interface;

determining the first set of components of the add-in user interface are not integrable with a modified set of components of the modified parent user interface;

integrating, in response to the determining, the first set of components of the add-in user interface with the prior parent user interface into which the first set of components of the add-in user interface are integrable, wherein integrating the first set of components of the add-in user interface with the prior parent user interface into which the first set of components of the add-in user interface are integrable comprises running the prior parent user interface including the integrated add-in user interface components as a background user interface that is not visually displayed;

generating a plurality of selectable components in the modified parent user interface corresponding to the integrated add-in user interface components which are integrated into the prior parent user interface, wherein generating the plurality of selectable components in the modified parent user interface comprises:

creating, in the modified parent user interface, a selectable add-in component comprising a plurality of selectable controls associated with the second set of functionalities of the add-in software application, the selectable add-in component populating, upon selection, a portion of the parent user interface with the plurality of selectable controls, organizing the plurality of selectable controls into a plurality of logical groupings of selectable controls comprising a first logical grouping of selectable controls associated with the add-in software application and at least one additional logical grouping of selectable controls associated with at least one additional add-in software application, the at least one additional logical grouping of selectable controls comprising additional selectable controls associated with the at least one additional add-in software application, laying out the plurality of logical groupings of selectable controls consistently with a layout of the modified set of components of the modified parent user interface;

linking each generated selectable component in the modified parent user interface with each corresponding integrated add-in user interface component that is integrated into the prior parent user interface, wherein each generated selectable component is one of the following: added by the add-in software application and modified by the add-in software application;

displaying the modified parent user interface; and selecting, in response to a selection of the generated selectable component in the modified parent user interface, the integrated add-in user interface component in the background user interface corresponding to the selected generated selectable component in the modified parent user interface.

14. The computer readable storage medium of claim 13, wherein displaying the modified parent user interface further comprises:

exposing the first set of functionalities of the parent software application and exposing each generated selectable component of the modified parent user interface corresponding to each integrated add-in user interface component that is integrated into the prior parent user interface.

15. The computer readable storage medium of claim 13, wherein linking each generated selectable component in the modified parent user interface with each corresponding integrated add-in user interface component that is integrated into the prior parent user interface includes embedding in each generated selectable component in the modified parent user interface a path to the corresponding integrated add-in user interface component that is integrated into the prior parent user interface.

16. The computer readable storage medium of claim 15, wherein selecting the integrated add-in user interface component in the prior parent user interface corresponding to the selected generated selectable component in the modified parent user interface includes passing an execution call along the path from the selected generated component in the modified parent user interface to the corresponding integrated add-in user interface component that is integrated into the prior parent user interface.

17. The computer readable storage medium of claim 14, further comprising:

receiving a selection of the generated selectable component in the modified parent user interface that is linked to the corresponding integrated add-in user interface component that is integrated into the prior version of the parent user interface; and activating, in response to receiving the selection of the generated selectable component in the modified parent user interface that is linked to the corresponding integrated add-in user interface component that is integrated into the prior version of the parent user interface, the corresponding selectable control of the plurality of selectable controls.

18. The computer readable storage medium of claim 17, further comprising executing a first functionality of the second set of functionalities of the add-in software application associated with the activated corresponding selectable control.

19. The computer readable storage medium of claim 14, wherein running the prior version of the parent user interface including the integrated add-in user interface components as a background user interface that is not visually displayed comprises running the prior version of the parent user interface while displaying the modified parent user interface, wherein any one of the second set of functionalities of the add-in software application that is provided to the parent software application is executed by the selection of the associated selectable control of the modified parent user interface that corresponds to the integrated add-in user interface component which is integrated into the prior parent user interface.

20. The computer readable storage medium of claim 19, further comprising automatically initiating the background user interface upon receiving a selection to display the modified parent user interface.

* * * * *